Figure 1:
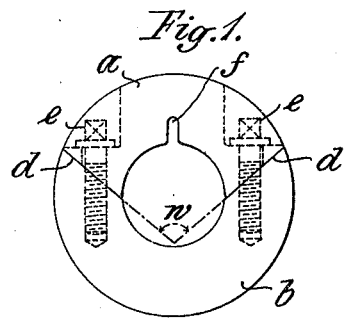

No. 770,501. PATENTED SEPT. 20, 1904.
E. KOTTUSCH.
CLAMP FASTENING FOR SPLIT RINGS.
APPLICATION FILED MAY 24, 1904.
NO MODEL. 2 SHEETS—SHEET 1.

Witnesses
Wm. Kuehne
John A. Percival.

Inventor
Emanuel Kottusch
By Richard S.
ATTORNEYS

No. 770,501. PATENTED SEPT. 20, 1904.
E. KOTTUSCH.
CLAMP FASTENING FOR SPLIT RINGS.
APPLICATION FILED MAY 24, 1904.
NO MODEL. 2 SHEETS—SHEET 2.
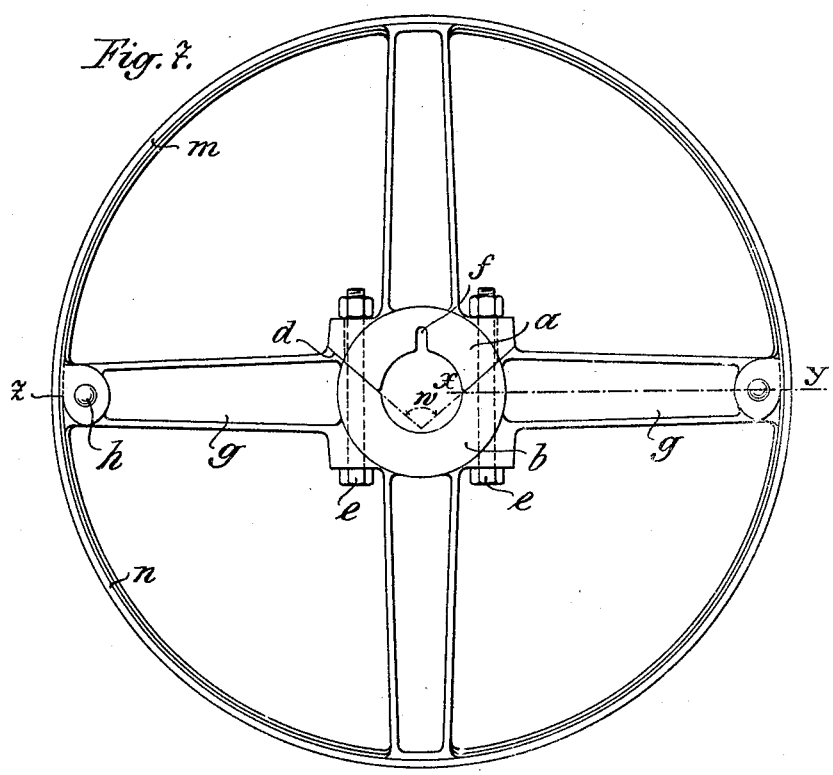
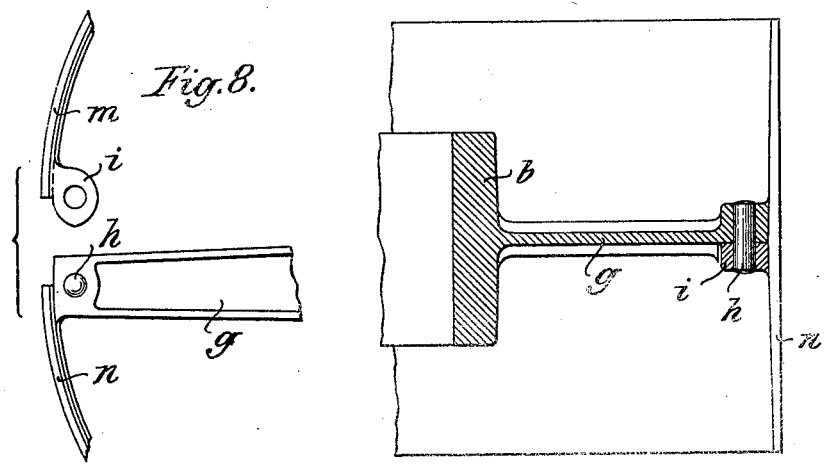
Witnesses
Wm. Kuehne
John A. Percival
Inventor
Emanuel Kottusch No. 770,501.

Patented September 20, 1904.

UNITED STATES PATENT OFFICE.

EMANUEL KOTTUSCH, OF WETZIKON, NEAR ZURICH, SWITZERLAND.

CLAMP-FASTENING FOR SPLIT RINGS.

SPECIFICATION forming part of Letters Patent No. 770,501, dated September 20, 1904.

Application filed May 24, 1904. Serial No. 209,547. (No model.)

*To all whom it may concern:*

Be it known that I, EMANUEL KOTTUSCH, manufacturer, a citizen of the Republic of Switzerland, and a resident of Wetzikon, near Zurich, Switzerland, have invented an Improved Clamp-Fastening for Split Rings, of which the following is a specification.

The subject of this invention is a fastening for split adjusting-rings, couplings, belt-pulleys, and the like, which is so made that when the binding-screws are tightened up the parts are securely clamped to the shaft.

The purpose of the invention is to obtain as uniform and as effective a clamping of the parts on the shaft over the whole of its circumference as is possible.

The split pulleys, rings, couplings, &c., are specially constructed so that the lines of division of the parts converge, forming an angle in the interior of the pulley, &c., and at the same time the part having the two converging surfaces is made with a groove which gives it a certain spring in a transverse plane perpendicular to the axis of the shafting. It follows that when the binding-screws are tightened up not only are the two parts of the ring drawn together, but simultaneously the two sides of that part having the spring action close tightly upon the circumference of the shaft. The shaft is therefore not only held between two surfaces drawn together above and below, but practically between three clamping-surfaces.

In the drawings annexed various forms of this clamp-fastening are shown.

Figure 2:
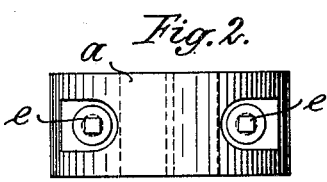
Figures 3, 4:
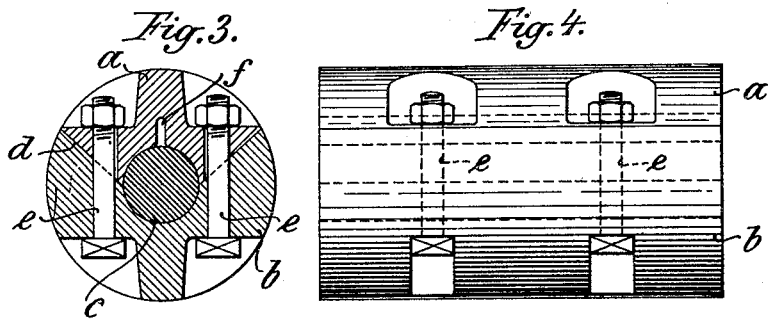
Figure 5:
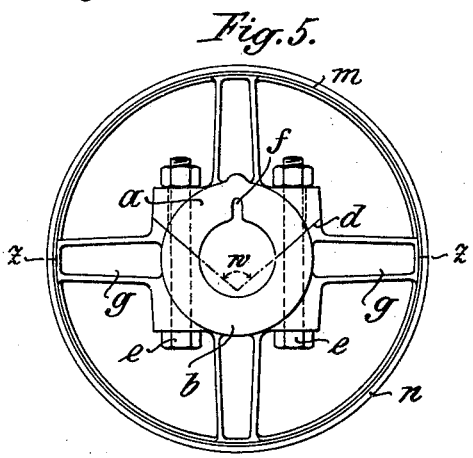
Figure 6:
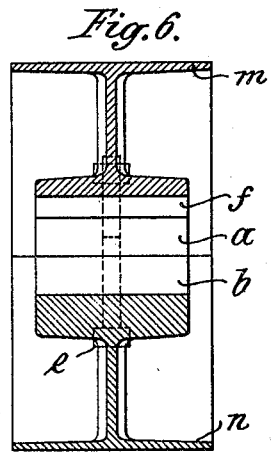

Figures 1 and 2 are end and plan views, respectively, of an adjusting-ring. Figs. 3 and 4 show a coupling in cross-section and side elevation. Figs. 5 and 6 show a small belt-pulley in end view and longitudinal section. Fig. 7 is an elevation of a large belt-pulley. Fig. 8 shows details of the circumferential joint in elevation. Fig. 9 is a sectional plan on the line X Y in Fig. 7.

In Fig. 1, $a$ is the upper part of the ring, and $b$ the lower. The line of division runs up obliquely on both sides from the middle of the bore, so that the two contact-surfaces $d$ run together to form an angle $w$. The two binding-screws $e$ are screwed into the lower part $b$, Fig. 1, or if they are bolts, Fig. 3, they are duly fitted into their holes. The bores for them in the upper part are somewhat larger than in the lower, so that when the screws are tightened the two sides of the upper part can incline inward to a slight extent. Such motion is rendered possible by the groove $f$. One advantageous mode of constructing the device is after the contact-surfaces $d$ have been prepared and the two parts fitted together to bore or turn the central hole in the ring exactly to the diameter of the shafting and then to cut the groove $f$ in the part $a$. On fastening the ring upon the shaft by tightening the screws $e$ the two parts $a$ and $b$ are forced one into the other, while the inclined planes $d$ slide one upon the other, and at the same time the two sides of the upper part $a$, that possess a certain spring as a result of the groove $f$, are subjected to a side pressure which forces them inward. The shaft is therefore held fast with a certain amount of spring between three clamping surfaces or cheeks.

In the coupling shown in Figs. 3 and 4 the formation of the two parts corresponds exactly with that in the case of the adjusting-ring shown in Figs. 1 and 2. In Fig. 3 the fastening upon the shaft $c$ is represented as tightened up.

In the belt-pulley shown in Figs. 5 and 6 it is to be observed that the division does not pass through a pair of arms. Both arms $g$ belong entirely to the part $b$; but the rim $m$ $n$ is divided in the central plane of the shaft at $z$, so that the ends of the upper half of the rim are supported against the upper half of the arms $g$, and therefore cannot spring inward under the tension of the belt. The same is also the case with the large belt-pulley shown in Figs. 7, 8, and 9. Here, however, the lug $i$ is cast on the upper half of the rim $m$, where it comes near the end of the arm $g$ of the lower half of the rim $n$. The pin $h$ is secured in the arm $g$ and is adapted to fit exactly, but not too tightly, the hole in the lug $i$. After the part $a$ has been placed on the part $b$ it is pushed laterally, so that the projecting pin $h$ on the arm $g$ will enter the hole in lug $i$, (see Fig. 9,) and thereby fasten the two parts together. By tightening up the bolts e the parts can be clamped on the shaft, as before. For split-toothed wheels or rope-pulleys the arrangement is similar to that for belt-pulleys.

Having now fully described my invention, what I claim, and desire to secure by Letters Patent, is—

1. A clamp-fastening for split adjusting-rings, couplings, belt-pulleys and the like made in two parts, and tightening-screws for said parts, the one part having angled surfaces whose planes, if extended, converge together and the other part having corresponding surfaces, the first part being provided with a groove or channel so that when the two parts are tightened up by the tightening-screws the sides of the said first part are drawn inward, substantially as described.

2. A clamp-fastening for split adjusting-rings, couplings, belt-pulleys and the like made in two parts adapted to fit together the upper part having inclined faces and a central groove and the lower part having corresponding inclined faces and means for holding the parts together, substantially as described.

3. A clamp-fastening comprising in combination a lower part b having inclined surfaces d, an upper part of wedge shape with a central space for the shaft, and also a groove above the central space and means for fastening the parts together, substantially as described.

Signed at Zurich, Switzerland, this 15th day of April, 1904.

EMANUEL KOTTUSCH.

Witnesses:
   A. LIEBERKNECHT,
   F. DOSSENBACH.